(12) United States Patent
York et al.

(10) Patent No.: US 10,768,600 B1
(45) Date of Patent: Sep. 8, 2020

(54) SYSTEMS AND METHODS TO FACILITATE PERMANENTLY MARKING A HOUSING COMPONENT FOR A FLUID CONTROL SYSTEM PRODUCT

(71) Applicant: Engineered Controls International, LLC, Elon, NC (US)

(72) Inventors: Tony York, Liberty, NC (US); John Cooke, Winston-Salem, NC (US)

(73) Assignee: Engineered Controls International, LLC, Elon, NC (US)

(*) Notice: Subject to any disclaimer, the term of this patent is extended or adjusted under 35 U.S.C. 154(b) by 212 days.

(21) Appl. No.: 15/955,138

(22) Filed: Apr. 17, 2018

Related U.S. Application Data

(60) Provisional application No. 62/487,258, filed on Apr. 19, 2017.

(51) Int. Cl.
*G06K 15/12* (2006.01)
*G05B 19/05* (2006.01)

(52) U.S. Cl.
CPC .... *G05B 19/05* (2013.01); *G05B 2219/15052* (2013.01)

(58) Field of Classification Search
None
See application file for complete search history.

(56) References Cited

U.S. PATENT DOCUMENTS

| | | | |
|---|---|---|---|
| 2005/0160362 A1* | 7/2005 | Obradovic | G06Q 10/10 715/274 |
| 2009/0128860 A1* | 5/2009 | Graushar | G06F 3/1215 358/3.28 |

* cited by examiner

*Primary Examiner* — Henok Shiferaw
(74) *Attorney, Agent, or Firm* — Neal, Gerber & Eisenberg LLP

(57) ABSTRACT

Systems and methods to facilitate permanently marking a housing component for a fluid control system product is disclosed. The system comprises a first processor, a second processor, and a printer. The first processor is configured to receive fixed information. The second processor is configured to receive the fixed information from the first processor, generate variable information, control a laser engraver to engrave the fixed and variable information into a workpiece, generate an information packet including the fixed information and the variable information, and transmit the information packet to the first processor. The printer includes a third processor configured to receive the information packet from the first processor and print the information packet onto a label.

27 Claims, 9 Drawing Sheets

SYSTEMS AND METHODS TO FACILITATE PERMANENTLY MARKING A HOUSING COMPONENT FOR A FLUID CONTROL SYSTEM PRODUCT

CROSS-REFERENCE

This application claims priority to U.S. Provisional Application No. 62/487,258, filed on Apr. 19, 2017, the contents of which are incorporated herein by reference in their entirety.

TECHINICAL FIELD

This disclosure generally relates to systems and methods to facilitate permanently marking a housing component for a fluid control system product, and more particularly the marking of a bonnet for use in connection with a regulator for liquid propane gas.

BACKGROUND

Fluid handling systems may include various fluid control system products, including regulators, valves, and the like. It is necessary to mark components of liquid handling systems for various reasons, including ensuring that the proper component has been selected and installed. Markings are often engraved into the components.

SUMMARY

An example system is disclosed. The example system comprises a first processor, a second processor, and a printer. The first processor is configured to receive fixed information. The second processor is configured to receive the fixed information from the first processor, generate variable information, control a laser engraver to engrave the fixed and variable information into a workpiece, generate an information packet including the fixed information and the variable information, and transmit the information packet to the first processor. The printer includes a third processor configured to receive the information packet from the first processor and print the information packet onto a label.

An example method is disclosed. The example method comprises receiving, with a first processor, fixed information; receiving, with a second processor, the fixed information from the first processor; generating, with the second processor, variable information; controlling, with the second processor, a laser engraver to engrave the fixed and variable information into a workpiece; generating, with the second processor, an information packet including the fixed information and the variable information; transmitting, with the second processor, the information packet to the first processor; receiving, with a third processor of a printer, the information packet from the first processor; and printing, with the printer, the information packet onto a label.

Another example system is disclosed. The example system comprises a programmable logic controller, a laser engraver controller, a laser engraver, and a printer. The programmable logic controller is configured to receive fixed information. The laser engraver controller is in communication with the programmable logic controller and is configured to: receive the fixed information from the programmable logic controller, generate variable information, generate an information packet including the fixed and variable information, and send the information packet to the programmable logic controller. The laser engraver is controlled by the laser engraver controller and is configured to engrave a workpiece with the fixed and variable information. The printer is in communication with the programmable logic controller and is configured to: receive the information packet from the programmable logic controller and print the information packet onto a label.

This application is defined by the appended claims. The description summarizes aspects of exemplary embodiments and should not be used to limit the claims. Other implementations are contemplated in accordance with the techniques described herein, as will be apparent upon examination of the following drawings and detailed description, and such implementations are intended to be within the scope of this application.

DETAILED DESCRIPTION OF THE DRAWINGS

Figure 1:
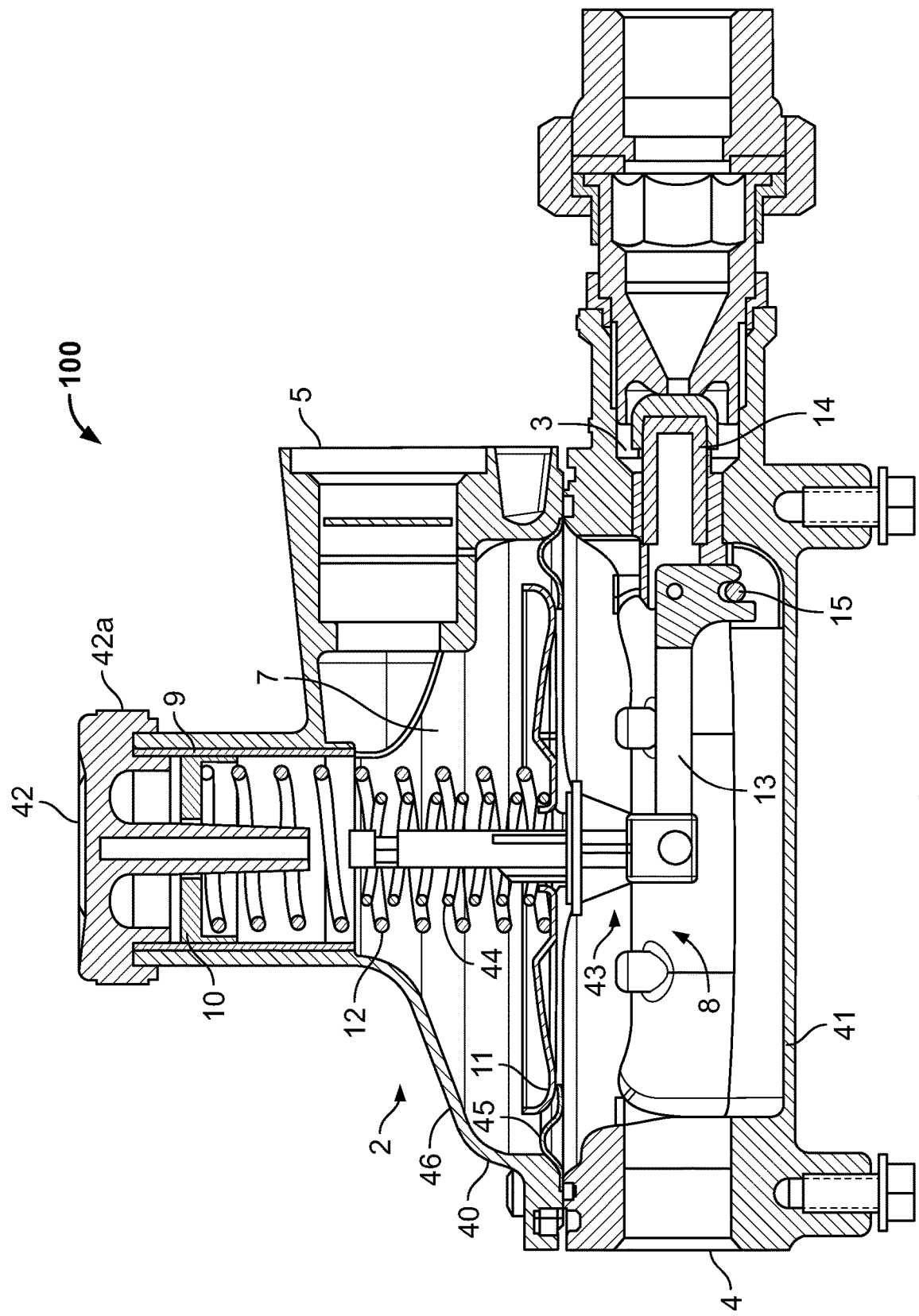
FIG. 1 is cross-sectional view of an exemplary regulator that may be used in connection with the disclosures herein.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. It should be appreciated that such relative terms are only for reference with respect to the appended drawings. These relative terms are not meant to limit the disclosed embodiments.

As stated above, the present specification is intended to be taken as a whole and interpreted in accordance with the principles of the present invention as taught herein and understood by one of ordinary skill in the art.

The disclosure herein is made in connection with a regulator, and in particular with a bonnet for such a regulator. Such a regulator may be, for example, a first stage regulator or a second stage regulator, or a twin stage regulator. It should be appreciated, however, that the methods taught herein could be used in connection with any workpiece (e.g., other regulators, other fluid control system components, etc.).

A regulator such as is disclosed herein may comprise a housing having a bonnet secured thereto by means of fasteners, and an inlet and an outlet. Various fluid control system components are disposed in the regulator to control flow therethrough including valves, vents, a diaphragm and the like. The internal structure of such regulators is known and will not be discussed in significant detail herein.

Traditionally, components of such systems are marked in various manners, including the use of dot matrix engravers to engrave information on the regulator bonnet. The bonnet may then be painted, so that the marking provided by the engraver is covered by the painting yet still visible to the end user. Such markings have been adequate for their purposes, but an improved marking system that improves the visibility and durability of the markings and ease of locating the markings is desired.

FIG. 1 is cross-sectional view of a first embodiment of an exemplary regulator 100 that may be used in connection with the disclosures herein. Regulator 100 is configured to intake fluid of varying pressure and flow rate, and then supply the fluid at a constant pressure. The regulator 100 may intake fluid from a utility fluid line (such as a natural gas line) outside of a home. The regulator 100 is then configured to deliver the fluid to appliances (e.g., stoves, furnaces, boilers, grills) inside of the home.

Regulator 100 includes a body 2 and a diaphragm assembly 8. Body 2 serves as a housing for regulator 100 and generally includes a lower body 41, a bonnet 40, and an end cap 42. Lower body 41 is joined and securely fastened to bonnet 40. End cap 42 includes a sealing portion 42a with external threads received in corresponding internal threads 9 of bonnet 40. End cap 42 includes a post 42b configured to contact a top of a yoke assembly 43 (discussed in greater detail below). Body 2 includes or defines an inlet 3, an outlet 4, a vent 5, and defines a first void 6 that serves as a fluid passage between inlet 3 and outlet 4, and a second void 7 that serves as a fluid passage between first void 6 and vent 5. The bonnet 40 includes a generally conical area 46 to receive the laser engraving in accordance with the teachings herein Diaphragm assembly 8 is located inside of body 2 and includes an adjustable spring seat 10 threaded into internal threads 9; a yoke assembly 43; a diaphragm plate 11 fastened to body 2 via a diaphragm 45, and configured to selectively separate first void 6 from second void 7; an arm 13 in mechanical communication with yoke assembly 43 on one end, a sealing block assembly 14 on the other end, pivotable about a pin 15 attached to lower body 41, and configured to vertically slide in yoke assembly 43; a first or outer spring 12 configured to regulate horizontal position of sealing block assembly 14 via arm 13; and a conical second or inner spring 44 configured to selectively enable venting (i.e., fluid communication between first void 6 and second void 7) by regulating vertical position of diaphragm plate 11 and/or diaphragm 45 with respect to yoke assembly 43. As noted above, this disclosure does not intend to discuss the entire operation or structure of such a regulator, as the reader is presumed to have a knowledge thereof. In some examples, the regulator 100 is composed of corrosion-resistant metallic materials (e.g., bronze, brass, copper alloys, zinc alloys, stainless steel, etc.).

Figure 2:
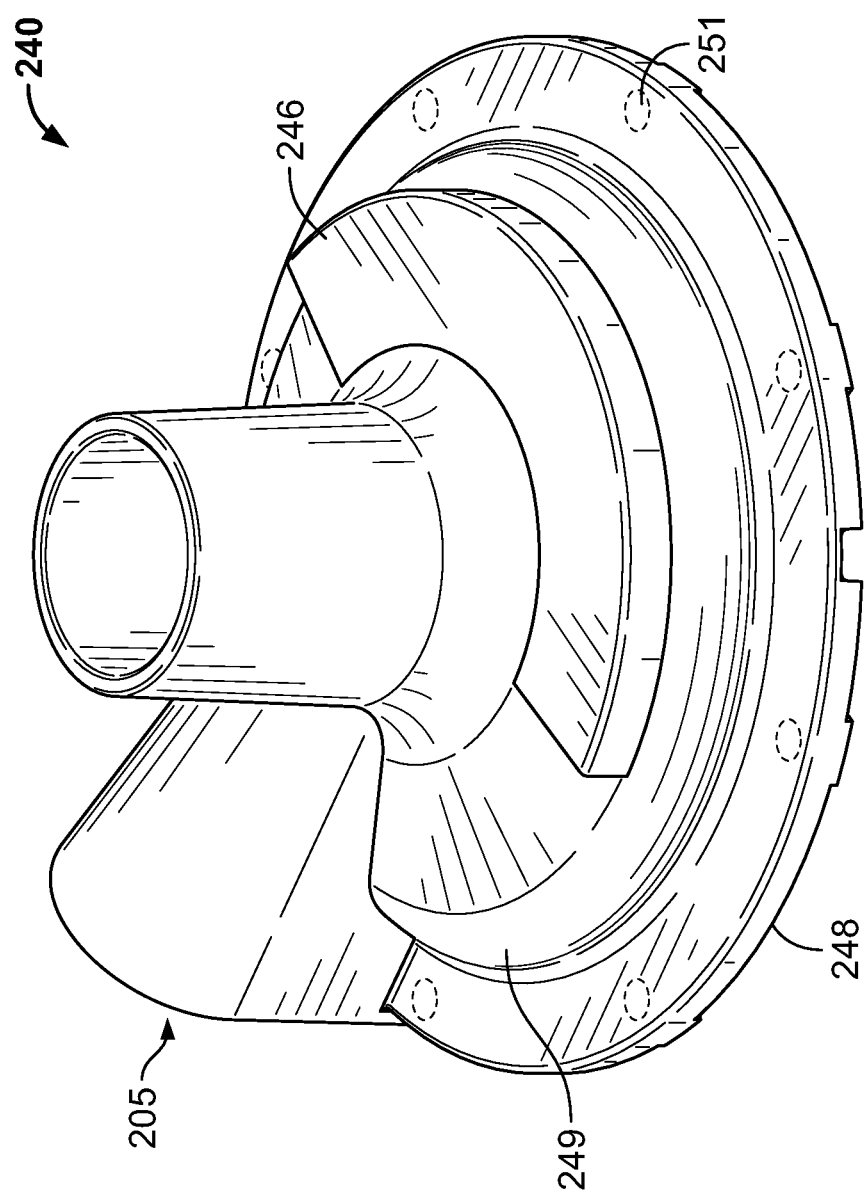
FIG. 2 is a perspective view of an alternative exemplary regulator bonnet for use with the disclosures herein.
Figure 3:
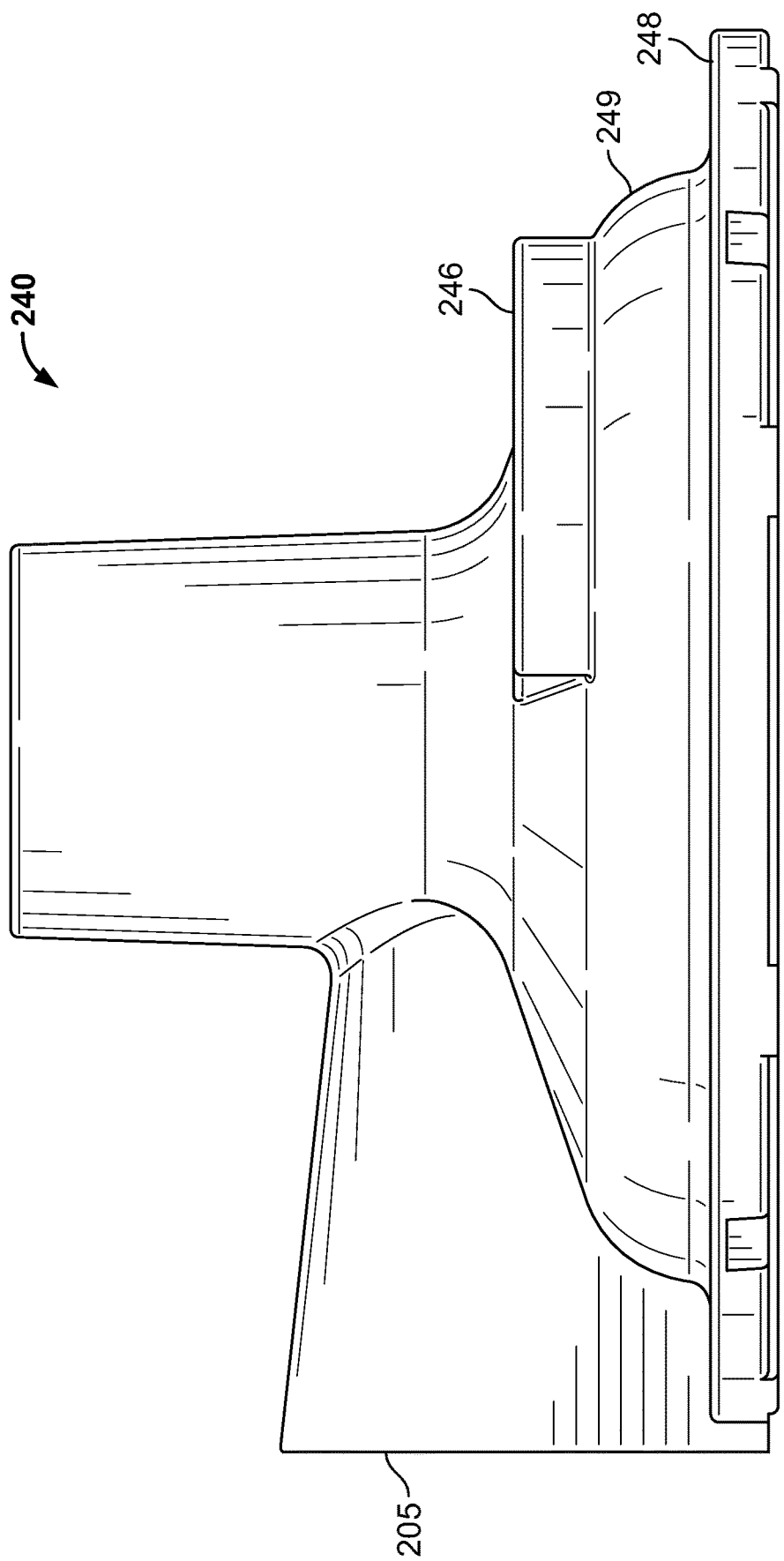
FIG. 3 is a side elevational view of the bonnet of FIG. 2.

FIG. 2 is a perspective view of an alternative exemplary regulator bonnet 240 for use with the disclosures herein. FIG. 3 is a side elevational view of the bonnet 240. In some examples, the alternative bonnet 240 is substituted for the bonnet 40 to assemble an alternative regulator 450, shown schematically in FIG. 4. In such examples, the lower body 41 is joined and securely fastened to the alternative bonnet 240.

The alternative bonnet 240 includes an ovate (e.g., generally, but not completely circular) base 248 and a raised area 249 extending upwardly therefrom. A plurality of fastener openings 251 are formed therein to connect bonnet to lower body 41. A pad area 246 extends upwards on one side of bonnet 240 and provides a generally flat surface to receive the laser engraving in accordance with the teachings herein.

Figure 4:
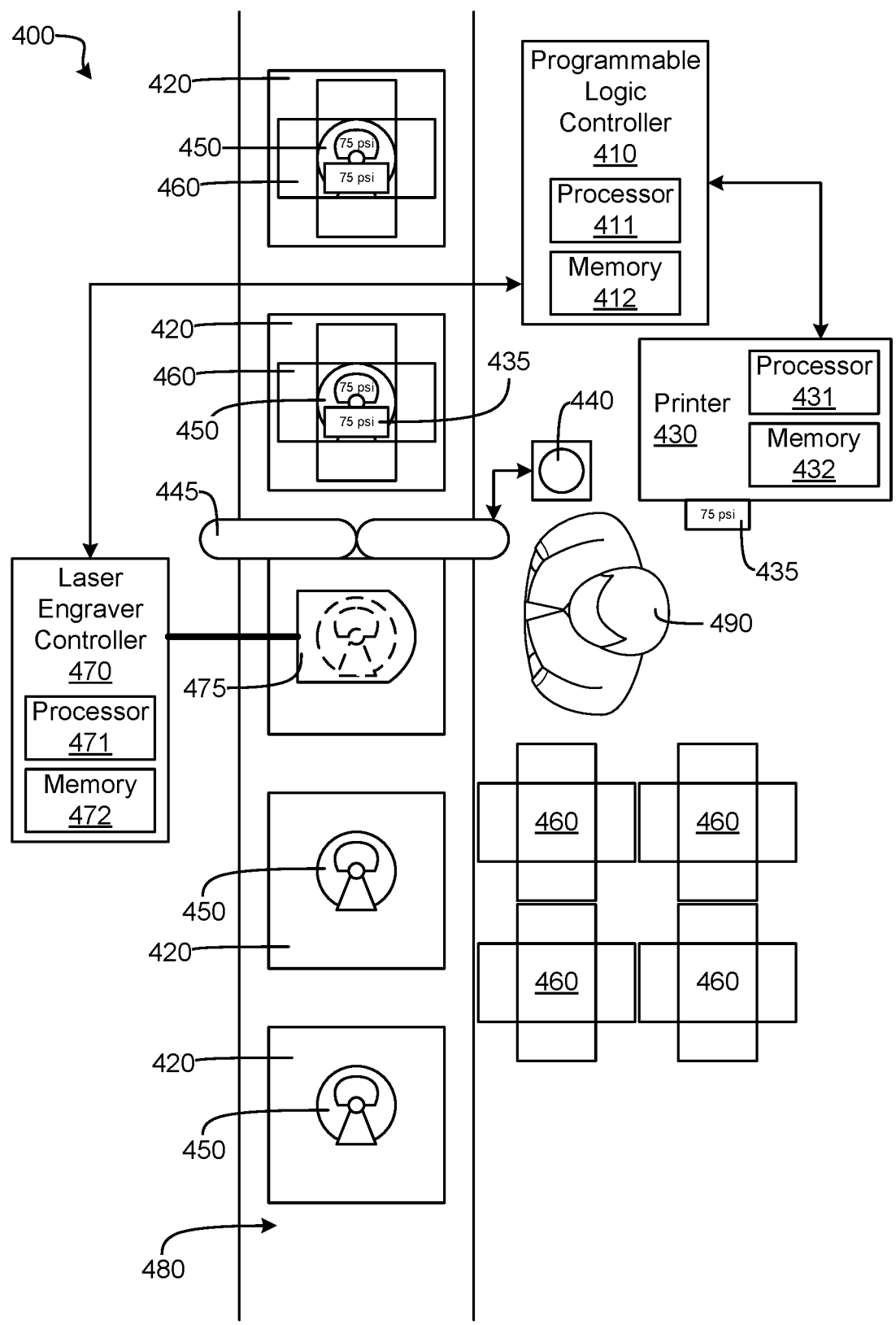
FIG. 4 is a schematic view of a system operating in accordance with the teachings of this disclosure.
Figure 5:
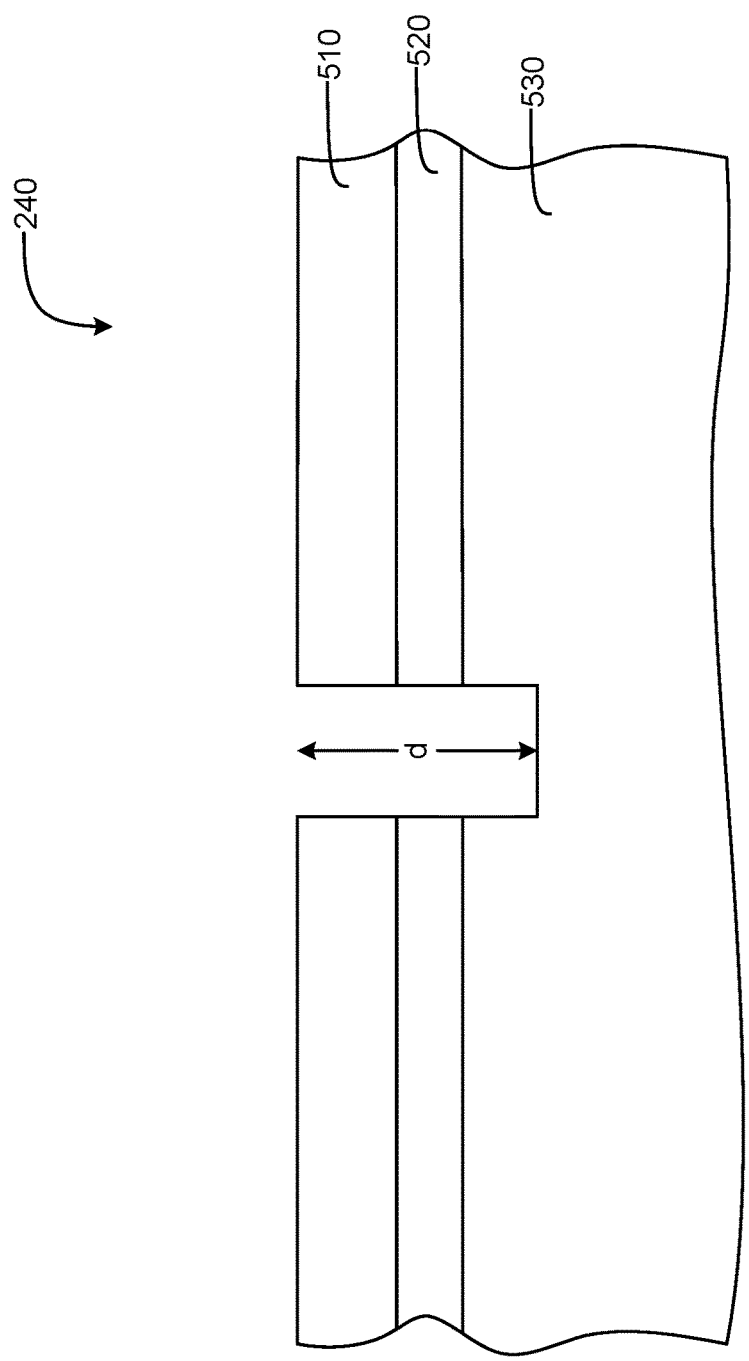
FIG. 5 is a detailed cross-sectional view of the bonnet of FIG. 2.
Figure 6:
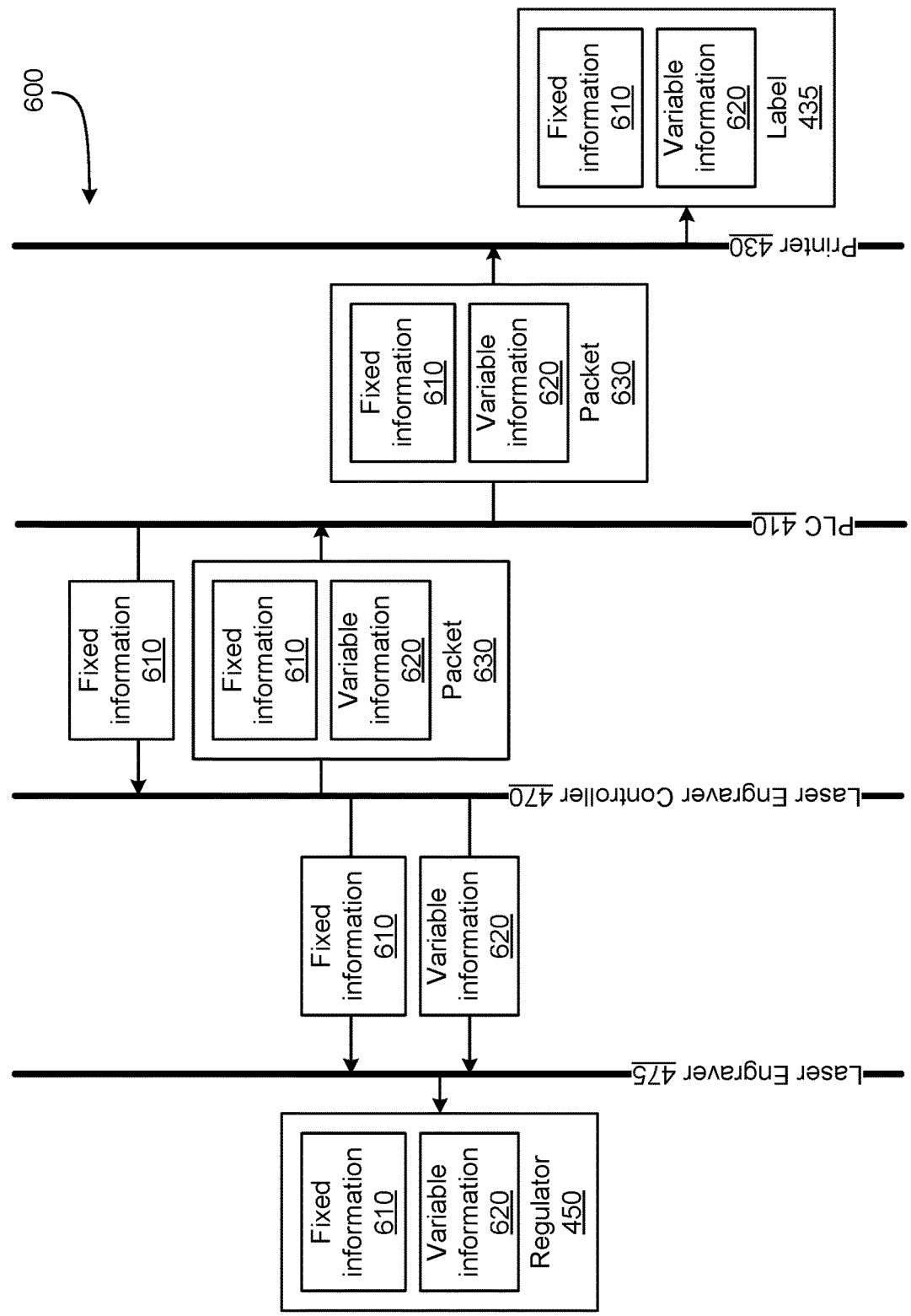
FIG. 6 illustrates an example information flow between electronic components of FIG. 4.

FIG. 4 is a schematic view of a system 400 operating in accordance with the teachings of this disclosure. FIG. 5 is a detailed cross-sectional view of the bonnet 240 of FIG. 2. FIG. 6 illustrates an example information flow 600 between electronic components of FIG. 4.

The system 400 includes a programmable logic controller (PLC) 410, a plurality of pallets 420, a printer 430, a button 440, a stop gate 445, a plurality of the alternative regulators 450, a plurality of shipping containers 460, a laser engraver controller 470, a laser engraver 475, a conveyer 480, and an operator 490. The PLC 410, the printer 430, the button 440, the stop gate 445, the laser engraver controller 470, the laser engraver 475, and the conveyer 480 are electronic components of the system 400.

The PLC 410 is in communication with the printer 430 and with the laser engraver controller 470 (e.g., via Ethernet wiring.). The laser engraver controller 470 communicates with the printer 430 via the PLC 410. The PLC 410 includes input devices (e.g., a mouse, a keyboard, a touchscreen, etc.) and output devices (e.g., a monitor, etc.). The PLC 410, printer 430, and laser engraver controller 470 include respective processors 411, 431, 471 and memories 412, 432, 472.

The processors 411, 431, 471 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

The memories 412, 432, 472 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high- capacity storage devices (e.g., hard drives, solid state drives, etc.). In some examples, the memories 412, 432, 472 includes multiple kinds of memory, particularly volatile memory and non-volatile memory.

The memories 412, 432, 472 are computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memories 412, 432, 472, the computer readable medium, and/or within the processors 411, 431, 471 during execution of the instructions.

The terms "non-transitory computer-readable medium" and "tangible computer- readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The pallets 420 are reusable containers (e.g., plastic tubs, fiberboard boxes, etc.) configured to be moved by the conveyor 480. During the assembly process shown in FIG. 4, the regulators 450 are placed in the pallets 420. The pallets 420 aid in moving the regulators 450 smoothly and efficiently through the system 400. The pallets 420 provide spacing between the regulators 450. By spacing the regulators 450 with the pallets 420 and running the conveyor 480 at a constant rate, the regulators 450 arrive to the operator 490 at a substantially even (e.g., regular, predictable, etc.) rate.

The printer 430 prints labels 435. The labels 435 are printed to show information corresponding to the regulators 450. In some examples, each of the labels 435 is printed to have information corresponding and particular to one of the regulators 450 (e.g., an identification number, a manufacturing timestamp, etc.). In other words, each of the regulators 450 has a corresponding individualized label 435. As shown in FIG. 4, the printer 430 is within reach of the operator 490 for the operator 490 to retrieve the labels 435 from the printer 430. Information printed on the labels 435 will be explained in greater detail in conjunction with FIGS. 5-8. For example, the labels 435 may be stickers, paper, card stock, plastic cards, etc.

The conveyor 480 is configured to carry the pallet 420 contained regulators 450 by the operator 490. The conveyor 480 is configured to allow the pallets 420 to slide relative to the conveyor 480. For example, the conveyor 480 may be a belt-type conveyor, a roller-type conveyor, etc.

The stop gate 445 is disposed across the conveyor 480. The stop gate 445 is controlled by the button 440. The stop gate 445 is configured to hold a pallet 420 and the regulator 450 contained therein under the laser engraver 475 and in front of the operator while the conveyor 480 continues to run under the stopped pallet 420. Thus, the conveyor 480 slides relative to the pallet 420 when the pallet 420 is stopped at the stop gate 445. It should be understood that the regulator 450 arrives at the stop gate 445 fully painted, dried, and assembled. When the operator 490 presses the button 440, the stop gate 445 opens. In some examples, the stop gate 445 closes after a predetermined time. In some examples, the stop gate 445 closes when the operator 490 pushes the button 440 a second time.

The shipping containers 460 are configured to contain the regulators 450 for transport from a manufacturing facility to a destination (e.g., a warehouse, a customer's facility, a sales facility, etc.). For example, the shipping containers 460 are cardboard boxes, padded envelopes, wooden crates, etc. A supply of the shipping containers 460 is within reach of the operator 490, as shown in FIG. 4.

The laser engraver controller 470 is in communication with the laser engraver 475. The laser engraver 475 is disposed over the conveyor 480 proximate to the stop gate 445. The laser engraver 475 is configured to produce a laser beam to engrave information regarding the regulator 450 under the laser engraver 475 onto the bonnet 240 of the regulator 450. The laser engraver controller 470 energizes, de-energizes, and controls the laser engraver 475 to produce and direct the laser beam. In some examples, the laser engraver controller 470 powers the laser engraver 475. The laser engraver controller 470 and laser engraver 475 may be a kit of a standard type such as is currently sold by Keyence, Model No. MD-F5220. It will be understood that the information regarding the regulator 450 could also be engraved elsewhere on regulator 450, such as on lower body 41. For other fluid control system products, information regarding those products could be engraved on an appropriate position that is visible and accessible.

More specifically, as shown in FIG. 5, the bonnet 240 has a paint layer 510, a metallic coating layer 520 (e.g., dichromate), and a base layer 530. The bonnets 240 of the regulators 450 are coated and painted during assembly of the regulators 450. The laser engraver 475 is configured to engrave through the paint layer 510, through the metallic coating layer 520, and into the base layer 530 to a specified depth d. In some examples, the laser engraver 475 engraves the pad area 246. In some examples, the laser engraver 475 engraves the generally conical area 46 (not shown). In some examples, the depth d is in a range from 5/1000 to 10/1000 of an inch, inclusive. Thus, the engraving made in the bonnet 240 is substantially permanent. In operation, the laser engraver 475 may take multiple passes (e.g., 7, 8, 9, etc.) to reach the specified depth d.

Looking again at FIGS. 4 and 6, in operation, fixed information is entered into the memory 412 of the PLC 410 by an operator 490. The regulators 450 in the pallets 420 are carried by the conveyor 480 until the pallet 420 contacts the closed stop gate 445 (e.g., is stopped). The PLC 410 sends the fixed information 610 to the laser engraver controller 470 using the processor 411. The laser engraver controller 470 generates variable information 620 using the processor 471. Further in operation, the laser engraver controller 470 energizes the laser engraver 475 to engrave the bonnet 240 of the regulator 450 with the fixed information 610 and the variable information 620. While the laser engraver 475 is engraving the bonnet 240, the laser engraver controller 470, using the processor 471, generates an information packet 630 and sends the packet 630 to the PLC 410. While the laser engraver 475 is engraving the bonnet 240, the PLC 410, using the processor 411, stores the packet 630 in the memory 412 and forwards the packet 630 to the printer 430. While the laser engraver 475 is engraving the bonnet 240, the printer 430 prints the label 435 to show the fixed information 610 and the variable information 620. Thus, the label 435 corresponding to the regulator 450 is ready (e.g., completely printed) close in time to when the laser engraver 475 has completed engraving the fixed and variable information 610, 620 to the specified depth d in the bonnet 240 (e.g., between 30 seconds before and 30 seconds after, etc.).

Further in operation, the operator 490 places the engraved regulator 450 and the label 435 in the shipping container 460. In some examples, the operator 490 places the shipping container 460 in the pallet 420, as shown in FIG. 4. In some examples, the operator 490 places the shipping container 460 on the conveyor 480 (not shown). In some examples, the operator 490 closes and seals (e.g., with packing adhesive tape) the shipping container 460. The operator 490 then presses the button 440 to release the shipping container 460 and the regulator 450 and the label 435 contained therein. In some examples, the shipping container 460 leaves the stop gate 445 open to be closed further downstream in the assembly process, as shown in FIG. 4.

Figure 7:
FIG. 7 illustrates examples of fixed and variable information generated by the components of FIG. 4.
Figure 7:
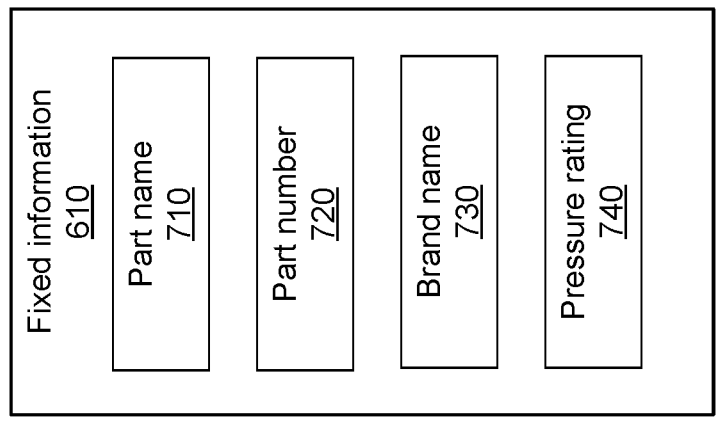
Figure 8:
FIG. 8 is an example database stored in a memory of FIG. 4.

FIG. 7 illustrates examples of fixed and variable information 610, 620 respectively generated by the PLC 410 and the laser engraver controller 470. FIG. 8 is an example database 800 stored in the memory 412.

As shown in FIG. 7, the fixed information 610 includes a part name 710, a part number 720, a brand name 730, and a pressure rating 740 (e.g., a maximum pressure, an optimal operation range, etc.). It should be understood that a manufacturer may produce parts under more than one brand name (e.g., for different global markets). The variable information 620 includes an identification number 750 and a manufacturing timestamp 760. The laser engraver controller 470 updates the identification number 750 for each regulator 450 engraved by the laser engraver 475. In other words, each subsequent regulator 450 has a different identification number 750. In some examples, the laser engraver controller 470 updates the manufacturing timestamp 760 for each regulator 450 engraved by the laser engraver 475. In such examples, the manufacturing timestamp 760 may include a number of minutes and/or seconds of when the regulator 450 was engraved. In other words, each subsequent regulator 450 has a different manufacturing timestamp 760. In some examples, the laser engraver controller 470 may update the manufacturing timestamp 760 according to an update schedule (e.g., hourly, daily, weekly, etc.). Thus, in such examples, the regulators 450 are engraved with the manufacturing timestamps 760 in batches (e.g., all regulators 450 engraved between 10:00 AM and 11:00 AM will have the same manufacturing timestamp 760). The manufacturing timestamp 760 may be in any format (e.g., mm/dd/yyyy hh:mm:ss, week/year, month/year, ddd/yyyy, etc.).

As shown in FIG. 8, the database 800 has a part name column 801, a part number column 802, a brand name column 803, a pressure rating column 804, an identification number column 805, and a manufacturing timestamp column 806. Each row of the database 800 indicates an information packet 630 of a particular regulator 450 engraved by the laser engraver 475.

The part name, part number, brand name, pressure rating, identification number, and manufacturing timestamp columns 801, 802, 803, 804, 805, 806 respectively include the part names 710, part numbers 720, brand names 730, pressure ratings 740, identification numbers 750, and manufacturing timestamps 760 of regulators 450 engraved by the laser engraver 475. As shown in the part name, part number, brand name, and pressure rating columns 801, 802, 803, 804, the part names 710, part numbers 720, brand names 730, and pressure ratings 740 across a product line are fixed information 610. For example, as shown in FIG. 8, "SuperValve" is part number "94978", is under the "ValveCo" brand, and has a "125 psi max" pressure rating. As shown in the identification number column 805, the identification numbers 750 are particular to individual regulators 450 and are thus variable information 620. In the example of FIG. 8, as shown in the manufacturing timestamp column 806, the manufacturing timestamps 760 may be particular to individual regulators 450. However, regulators 450 may be timestamped in batches, as discussed above.

Figure 9:
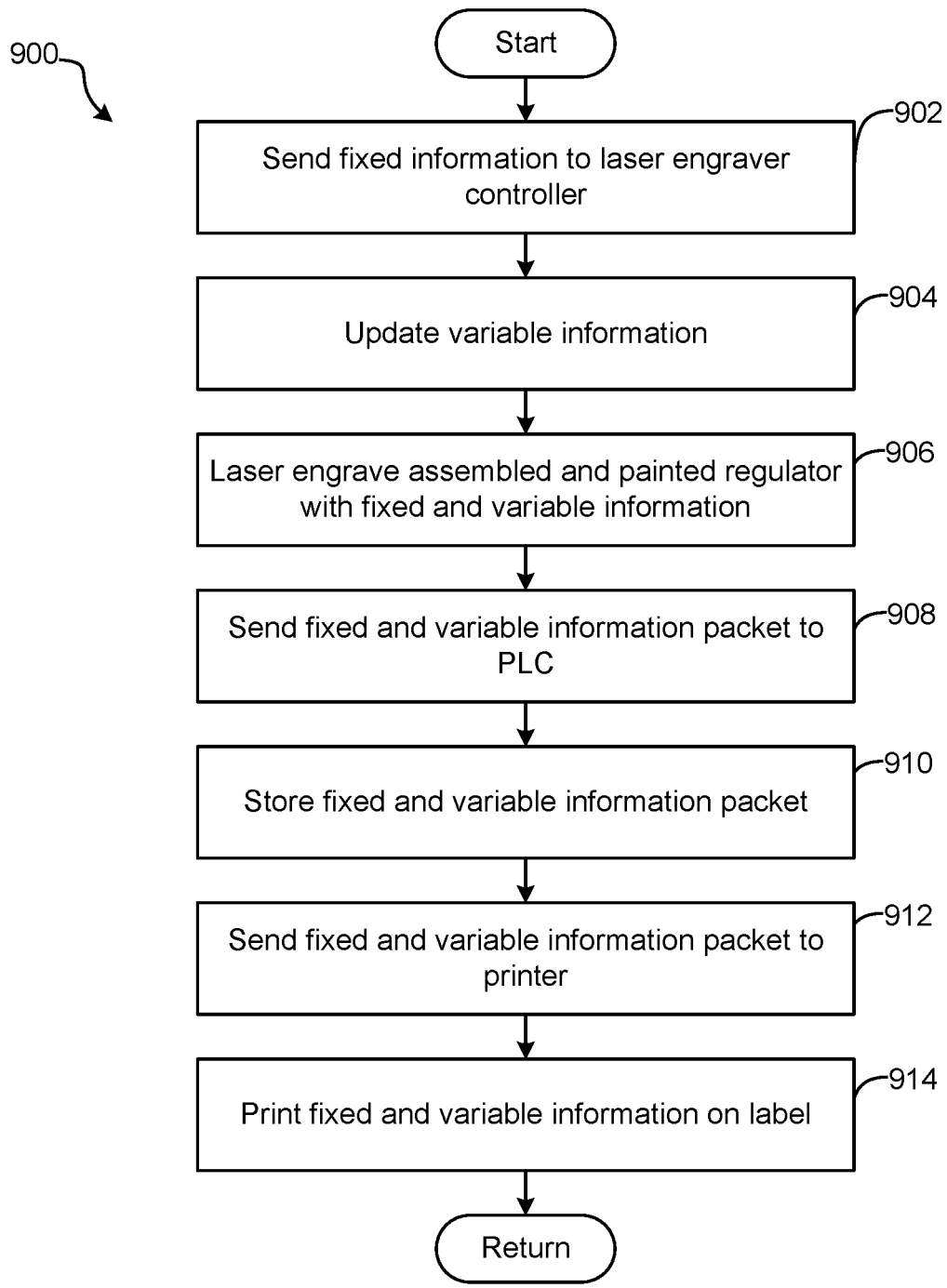
FIG. 9 is a flowchart of a method to engrave bonnets and provide corresponding labels, which may be implemented by the electronic components of FIG. 4.

FIG. 9 is a flowchart of a method 900 to engrave bonnets and provide corresponding labels, which may be implemented by the electronic components of FIG. 4 The flowchart of FIG. 9 is representative of machine readable instructions stored in memory (such as the memories 412, 432, 472 of FIG. 4) that comprise one or more programs that, when executed by processor(s) (such as the processors 411, 431, 471 of FIG. 4), cause the system 400 to laser engrave regulators 450, print corresponding labels 435, and store information packets 630 as described above. Further, although the example program(s) is/are described with reference to the flowchart illustrated in FIG. 9, many other methods of laser engraving the regulators 450, printing corresponding labels 435, and storing the information packets 630 may alternatively be used. For example, the order of execution of the blocks may be changed, and/or some of the blocks described may be changed, eliminated, or combined. It should be understood that the method 900 may be used in place of prior known marking methods (e.g., dot matrix engraving, etc.) or the method 900 may be used in conjunction with the prior methods, whereby certain information is marked using the system 400 and method 900, and other information may be marked on the same product or component thereof using the prior method, depending on the user's needs.

Referring to FIG. 9, initially, at block 902, the PLC 410 sends the fixed information 610 to the laser engraver controller 470. As discussed above, the fixed information 610 includes the part name 710, the part number 720, a brand name 730, and a pressure rating 740.

At block 904, the laser engraver controller 470 updates the variable information 620. As discussed above, the variable information 620 includes the identification number 750 and the manufacturing timestamp 760.

At block 906, the laser engraver controller 470 controls the laser engraver 475 to engrave a regulator 450 with the fixed and variable information 610, 620. As discussed above, regulator 450 is assembled and painted prior to laser engraving. The laser engraver 475 engraves through paint and metallic coating layers 510, 520 into a base layer 530 of the regulator 450 to a specified depth d, as discussed above.

At block 908, the laser engraver controller 470 generates and sends an information packet 630 to the PLC 410 including the fixed information 610 and the variable information 620. As discussed above, the information packet 630 is generated and sent while the laser engraver 475 is engraving the regulator (block 906).

At block 910, the PLC 410 stores the information packet 630 in the memory 412. As discussed above, the PLC 410 stores the information packet 630 while the laser engraver 475 is engraving the regulator (block 906). Collectively, the information packets 630 corresponding to the engraved regulators 450 form the database 800 of FIG. 8.

At block 912 the PLC 410 sends the information packet 630 to the printer 430. As discussed above, the PLC 410 sends the information packet 630 to the printer 430 while the laser engraver 475 is engraving the regulator (block 906).

At block 914, the printer 430 prints a label 435 showing the fixed and variable information 610, 620 included in the information packet 630. As discussed above, the printer 430 prints the information packet 630 while the laser engraver 475 is engraving the regulator (block 906). The method 900 then returns to block 902.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

From the foregoing, it should be appreciated that the above disclosed systems and methods may provide markings that are highly visible as well as permanent. By laser engraving through a painted layer of a workpiece into a base layer, engraved information may highly contrast with the painted layer. Further, by printing labels to have the same information as is engraved on the workpiece while the laser engraving is being performed, the labels may be packaged with the engraved workpiece as soon as the engraving is complete. Thus, the supporting documentation provided by the label is less likely to be lost or separated from the workpiece. It should also be appreciated that the disclosed systems and methods provide a specific solution—laser engraving through a paint layer into a metallic base layer and printing labels matching laser engravings while the laser engraving is performed—to specific problems—illegible markings on products and misplaced supporting documents for those products.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The method disclosed herein provides the benefit of a marking that is highly visible as well as permanent. This new method may be used in place of the prior known systems (e.g., the dot matrix system discussed above) or it may be used in conjunction with the prior system, whereby certain information is marked using the new systems and method disclosed herein, and other certain information may be marked on the same product or component thereof using the prior art method, depending on the user's needs.

What is claimed is:

1. A system comprising:
a first processor configured to receive fixed information;
a second processor configured to:
receive the fixed information from the first processor,
generate variable information,
control a laser engraver to engrave the fixed and variable information into a workpiece,
generate an information packet including the fixed information and the variable information, and
transmit the information packet to the first processor; and
a printer including a third processor configured to receive the information packet from the first processor and print the information packet onto a label;
wherein the second processor is configured to update the variable information for subsequent workpieces.

2. The system of claim 1, wherein the workpiece has a paint layer and a base layer and the laser engraver is configured to engrave through the paint layer and into the base layer.

3. The system of claim 1, wherein the printer is configured to print the label while the laser engraver engraves the workpiece.

4. The system of claim 1, further comprising a memory configured to store the information packet in a database.

5. The system of claim 1, wherein the fixed information includes at least one of a part name, a part number, a brand name, and a pressure rating; and the variable information includes at least one of an identification number and a manufacturing timestamp.

6. A system comprising:
a first processor configured to receive fixed information;
a second processor configured to
receive the fixed information from the first processor,
generate variable information,
control a laser engraver to engrave the fixed and variable information into a workpiece, wherein the workpiece has a paint layer and a base layer and the laser engraver is configured to engrave through the paint layer and into the base layer and the laser engraver is configured to engrave the workpiece to a depth between 5/1000 inch and 10/1000 inch, inclusive;
generate an information packet including the fixed information and the variable information, and
transmit the information packet to the first processor; and
a printer including a third processor configured to receive the information packet from the first processor and print the information packet onto a label.

7. The system of claim 6, wherein the second processor is configured to update the variable information for subsequent workpieces.

8. The system of claim 6, wherein the printer is configured to print the label while the laser engraver engraves the workpiece.

9. The system of claim 6, further comprising a memory configured to store the information packet in a database.

10. The system of claim 6, wherein the fixed information includes at least one of a part name, a part number, a brand name, and a pressure rating; and the variable information includes at least one of an identification number and a manufacturing timestamp.

11. A method comprising:
receiving, with a first processor, fixed information;
receiving, with a second processor, the fixed information from the first processor;
generating, with the second processor, variable information;
controlling, with the second processor, a laser engraver to engrave the fixed and variable information into a workpiece;
generating, with the second processor, an information packet including the fixed information and the variable information;
transmitting, with the second processor, the information packet to the first processor;

receiving, with a third processor of a printer, the information packet from the first processor;

printing, with the printer, the information packet onto a label; and updating, with the second processor, the variable information for subsequent workpieces.

12. The method of claim 11, wherein the workpiece comprises a paint layer and a base layer; and the laser engraver is configured to engrave through the paint layer and into the base layer.

13. The method of claim 11, wherein printing the label is performed while the laser engraver engraves the workpiece.

14. The method of claim 11, further comprising storing, with the first processor, the information packet in a database stored in a memory.

15. The method of claim 11, wherein:
the fixed information includes at least one of a part name, a part number, a brand name, and a pressure rating; and
the variable information includes at least one of an identification number and a manufacturing timestamp.

16. A method comprising:
receiving, with a first processor, fixed information;
receiving, with a second processor, the fixed information from the first processor;
generating, with the second processor, variable information;
controlling, with the second processor, a laser engraver to engrave the fixed and variable information into a workpiece, wherein the laser engraver is configured to engrave the workpiece to a depth between 5/1000 inch and 10/1000 inch, inclusive;
generating, with the second processor, an information packet including the fixed information and the variable information;
transmitting, with the second processor, the information packet to the first processor;
receiving, with a third processor of a printer, the information packet from the first processor; and
printing, with the printer, the information packet onto a label.

17. The method of claim 16, further comprising updating, with the second processor, the variable information for subsequent workpieces.

18. The method of claim 16, wherein the workpiece comprises a paint layer and a base layer; and the laser engraver is configured to engrave through the paint layer and into the base layer.

19. The method of claim 16, wherein printing the label is performed while the laser engraver engraves the workpiece.

20. The method of claim 16, further comprising storing, with the first processor, the information packet in a database stored in a memory.

21. The method of claim 16, wherein the fixed information includes at least one of a part name, a part number, a brand name, and a pressure rating; and the variable information includes at least one of an identification number and a manufacturing timestamp.

22. A system comprising:
a programmable logic controller configured to receive fixed information;
a laser engraver controller in communication with the programmable logic controller and configured to
receive the fixed information from the programmable logic controller,
generate variable information,
generate an information packet including the fixed and variable information, and
send the information packet to the programmable logic controller;
a laser engraver controlled by the laser engraver controller and configured to engrave a workpiece with the fixed and variable information; and
a printer in communication with the programmable logic controller and configured to
receive the information packet from the programmable logic controller and
print the information packet onto a label.

23. The system of claim 22, wherein the workpiece comprises a paint layer, a metallic coating layer, and a base layer; and the laser engraver is configured to engrave through the paint layer and the metallic coating layer and into the base layer.

24. The system of claim 22, wherein the printer is configured to print the label while the laser engraver engraves the workpiece.

25. The system of claim 22, wherein:
the fixed information includes at least one of a part name, a part number, a brand name, and a pressure rating; and
the variable information includes at least one of an identification number and a manufacturing timestamp.

26. The system of claim 25, wherein the laser engraver controller is configured to update the identification number and the manufacturing timestamp for each subsequent workpiece.

27. The system of claim 25, wherein the laser engraver controller is configured to update the identification number for each subsequent workpiece, and update the manufacturing timestamp according to an update schedule.

* * * * *